United States Patent
Shen et al.

(10) Patent No.: US 10,434,870 B2
(45) Date of Patent: Oct. 8, 2019

(54) ADSORPTION STORAGE TANK FOR NATURAL GAS

(71) Applicant: GM GLOBAL TECHNOLOGY OPERATIONS LLC, Detroit, MI (US)

(72) Inventors: Jingmei Shen, Sterling Heights, MI (US); Anne M. Dailly, West Bloomfield, MI (US); Fang Dai, Troy, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 593 days.

(21) Appl. No.: 15/152,254

(22) Filed: May 11, 2016

(65) Prior Publication Data

US 2017/0326972 A1    Nov. 16, 2017

(51) Int. Cl.
*B60K 15/03* (2006.01)
*B01J 20/20* (2006.01)
(Continued)

(52) U.S. Cl.
CPC ............. *B60K 15/03* (2013.01); *B01D 53/02* (2013.01); *B01D 53/04* (2013.01); *B01J 20/205* (2013.01); *B01J 20/226* (2013.01); *B01J 20/28078* (2013.01); *C10L 3/06* (2013.01); *B01D 2253/102* (2013.01); *B01D 2253/202* (2013.01); *B01D 2253/204* (2013.01); *B01D 2253/308* (2013.01); *B01D 2253/31* (2013.01); *B01D 2256/16* (2013.01); *B01D 2256/24* (2013.01);
(Continued)

(58) Field of Classification Search
CPC ........ B60K 15/03; B01D 53/02; B01D 53/04; B01J 20/205; B01J 20/226; B01J 20/2807; C10L 3/06
See application file for complete search history.

(56) References Cited

U.S. PATENT DOCUMENTS 5,308,821 A    5/1994  Chang
8,366,979 B2   2/2013  Dai et al.
(Continued)

FOREIGN PATENT DOCUMENTS

CN    107366824 A      11/2017
DE    102017207547 A1  11/2017
(Continued)

OTHER PUBLICATIONS

Remick, R. J., et al., "Advanced Onboard Storage Concepts for Natural Gas-Fueled Automotive Vehicles", Institute of Gas Technology project 61067 for NASA, Jun. 1984, 139 pgs.
(Continued)

*Primary Examiner* — Melvin C. Mayes
*Assistant Examiner* — Michael Forrest
(74) *Attorney, Agent, or Firm* — Harness, Dickey & Pierce, P.L.C.

(57) ABSTRACT

An adsorption storage tank for a natural gas includes a pressurizable tank disposed on a vehicle to contain the natural gas. A natural gas adsorbent is disposed in the tank. The natural gas is a mixture of constituents having a constituent statistical distribution of molecule lengths and kinetic diameters. The adsorbent has a pore size statistical distribution of pore sizes to adsorb and desorb the mixture of constituents.

19 Claims, 4 Drawing Sheets

(51) Int. Cl.
  *B01J 20/22* (2006.01)
  *C10L 3/06* (2006.01)
  *B01D 53/02* (2006.01)
  *B01J 20/28* (2006.01)
  *B01D 53/04* (2006.01)

(52) U.S. Cl.
  CPC .. *B01D 2256/245* (2013.01); *B01D 2257/108* (2013.01); *B01D 2257/7022* (2013.01); *B01D 2257/7025* (2013.01); *B01D 2259/4525* (2013.01); *B01D 2259/4566* (2013.01); *B60K 15/03006* (2013.01); *B60K 2015/03315* (2013.01); *C10L 2270/02* (2013.01); *C10L 2290/542* (2013.01); *Y02E 60/321* (2013.01)

(56) References Cited

U.S. PATENT DOCUMENTS

| | | | |
|---|---|---|---|
| 8,685,366 | B2 | 4/2014 | Chaumonnot et al. |
| 9,249,931 | B2 | 2/2016 | Morales et al. |
| 9,249,933 | B2 | 2/2016 | Morales et al. |
| 9,328,868 | B2 | 5/2016 | Dailly et al. |
| 9,624,851 | B2 | 4/2017 | Dailly et al. |
| 9,746,134 | B2 | 8/2017 | Dailly et al. |
| 9,874,311 | B2 | 1/2018 | Morales et al. |
| 10,018,307 | B2 | 7/2018 | Ortmann et al. |
| 2014/0018238 | A1* | 1/2014 | Bajaj ............... B01J 20/20 502/401 |
| 2014/0113811 | A1* | 4/2014 | Stadie ............... C07C 9/04 502/400 |
| 2014/0290611 | A1* | 10/2014 | Abd Elhamid ......... F02B 43/02 123/1 A |
| 2014/0291048 | A1 | 10/2014 | Morales et al. |
| 2015/0258487 | A1* | 9/2015 | Hornbostel ........... F17C 11/005 206/0.7 |
| 2016/0097348 | A1 | 4/2016 | Abd Elhamid et al. |
| 2018/0023516 | A1 | 1/2018 | Zhang et al. |

FOREIGN PATENT DOCUMENTS

| | | |
|---|---|---|
| EP | 0218403 | 12/1992 |
| EP | 1167861 | 1/2002 |

OTHER PUBLICATIONS

Naviroj, Maninpat, "Hierarchically Porous Ceramics by Freeze Casting of Preceramic Polymers", Faber Research Group, 2014, 1pg, http://www.caltech.edu/.

Nakhla, Josephine, "Metal Organic Frameworks (MOFs)", Aldrich ChemFiles 2009, 9.2, 19, 2 pages.

* cited by examiner

| Constituent | Mole Percentage | Pore Size (Angstroms) |
|---|---|---|
| CH4 | 70% - 90% | 10 - 12 |
| C2H6 | 0.1% - 20% | 12 - 13 |
| C3H8 | 0.1% - 1.5% | 13 - 14 |
| C4H10 | 0.01% - 0.3% | |
| CO2 | 0.1% - 8% | 15 - 17 |
| O2 | 0 - 0.2% | |
| N2 | 0 - 5% | |
| H2S | 0 - 5% | 11 - 13 |
| Ar, He, Ne, Xe | Trace | |

ADSORPTION STORAGE TANK FOR NATURAL GAS

BACKGROUND

Some internal combustion engines (ICEs) are designed to operate on natural gas fuel. Such natural gas fueled ICEs may be dedicated natural gas engines, or multi-fuel engines. A dedicated natural gas engine operates only on natural gas. A multi-fuel engine is capable of operating on multiple fuel types. For example, bi-fuel engines are capable of operating on two different fuel types. One fuel type may be a liquid phase fuel including gasoline, ethanol, bio-diesel, diesel fuel or combinations thereof that are delivered to the bi-fuel engine substantially in a liquid state. The other fuel type may include an alternative fuel, e.g., Compressed Natural Gas (CNG), Adsorbed Natural Gas (ANG), Liquefied Petroleum Gas (LPG), hydrogen, etc. The two different fuels are stored in separate tanks, and the bi-fuel engine may run on one fuel at a time, or may alternatively run on a combination of the two different fuel types.

Natural gas may be stored on a vehicle in several ways. Some vehicles store the natural gas in pressurizable tanks. Some vehicles have a natural gas adsorbent in the natural gas tanks to increase the mass of natural gas that may be stored in the tank at a lower pressure. ANG is distinguished from CNG which is stored in pressurized vessels without adsorbent.

SUMMARY

An adsorption storage tank for a natural gas includes a pressurizable tank disposed on a vehicle to contain the natural gas. A natural gas adsorbent is disposed in the tank. The natural gas is a mixture of constituents having a constituent statistical distribution of molecule lengths and kinetic diameters. The adsorbent has a pore size statistical distribution of pore sizes to adsorb and desorb the mixture of constituents.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figures 1, 2:
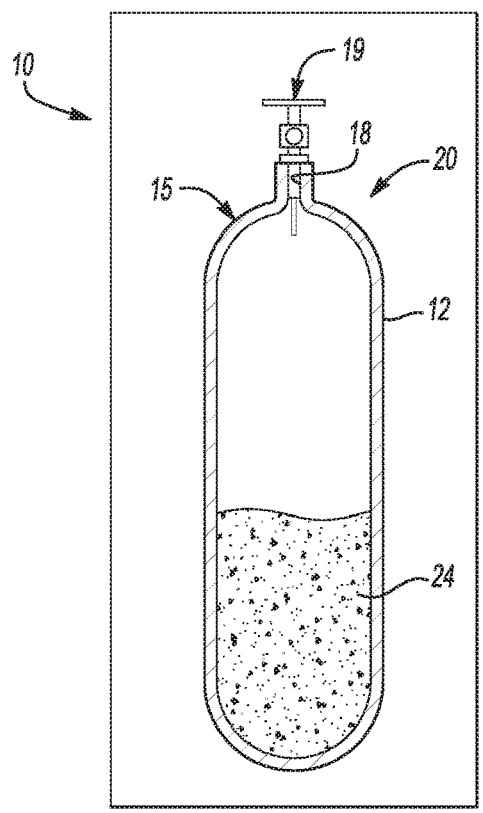
FIG. 1 is a cross-sectional, semi-schematic view of an example of a pressurizable tank according to the present disclosure.
FIG. 2 is a table of constituents of typical pipeline natural gas in the United States of America.

Internal combustion engines (ICEs) combust fuel inside an engine to perform work. Some ICEs are used in vehicles to provide motive power to the vehicles. As used herein, vehicle means a self-propelled mobile machine that transports passengers or cargo. Examples of vehicles according to the present disclosure are: motor vehicles (motorcycles, cars, trucks, buses, trains), and watercraft (ships, boats).

In some cases, ICEs are defined by the type of fuel that the ICEs are designed to consume. For example, some diesel engines may run on diesel grade 1-D, or diesel grade 2-D. Gasoline engines may typically run on gasoline. Bi-fuel engines may be compatible with two types of fuel, for example, gasoline and natural gas.

SAE International, initially established as the Society of Automotive Engineers (SAE), is a U.S.-based, globally active professional association and standards organization for engineering professionals in various industries.

SAE Surface Vehicle Recommended Practice J1616, Recommended Practice for Compressed Natural Gas Vehicle Fuel, Issued February 1994, describes natural gas as follows: Natural gas is comprised chiefly of methane (generally 88 to 96 mole percent) with the balance being a decreasing proportion of non-methane alkanes (i.e., ethane, propane, butanes, etc.). Other components found in natural gas are nitrogen ($N_2$), carbon dioxide ($CO_2$), water, oxygen, and trace amounts of lubricating oil (from compressors) and sulfur found as hydrogen sulfide ($H_2S$) and other sulfur compounds. Before entering the commercial natural gas transmission system, natural gas is processed to meet limits on hydrogen sulfide, water, condensables of heavier hydrocarbons, inert gases such as $CO_2$ and $N_2$, and energy content. Mercaptan odorants (e.g., tertiary butyl mercaptan) are added by local distribution companies (LDC's) to add a human-detectable odor to natural gas which otherwise would be odorless.

As used herein, natural gas means a gaseous mixture of constituents including predominately methane. Natural gas may include varying amounts of other higher alkanes and smaller amounts of carbon dioxide, nitrogen, and hydrogen sulfide. In an example, natural gas constituents by mass fraction may be about: methane 81.55%, ethane 6.79%, propane 4.98%, hexane 0.97%, hydrogen 0.01%, carbon monoxide 0.16%, and inert gases (nitrogen) 5.4%. The amount of methane in natural gas may vary, depending on the source. In another example, natural gas constituents by mass may be about: methane 75%, ethane 15%, and other hydrocarbons about 5%.

In an example, the natural gas may include methane, ethane, propane, hexane, and hydrogen. The natural gas may include about 78 mole percent to about 96 mole percent methane, and non-methane alkanes in decreasing proportion as a molar mass of the non-methane alkanes increases.

Referring now to FIG. 1, an example of an adsorption storage tank 15 for a natural gas is depicted. The adsorption storage tank 15 includes a pressurizable tank 20 disposed on a vehicle 10 to contain the natural gas. The natural gas is consumable by the vehicle 10 as fuel.

The pressurizable tank 20 includes a container 12. A natural gas adsorbent 24 is operatively disposed in the tank 20; more specifically, the natural gas adsorbent 24 is operatively disposed within the container 12 of the pressurizable tank 20. The natural gas is a mixture of constituents having a constituent statistical distribution of molecule lengths and kinetic diameters. Constituent statistical distribution refers to the probability that a sample of natural gas will have particular constituents. The adsorbent 24 has a pore size statistical distribution of pore sizes to adsorb and desorb the mixture of constituents. Pore size statistical distribution refers to the probability that a random sample of adsorbent will have pores with a particular pore size. As used herein, physical distribution refers to the spatial location of the pores. In examples of the present disclosure, the physical distribution of pore sizes of the adsorbent may be homogenous in the pressurizable tank 20. This is different from establishment of a filter or buffer adsorbent at an opening of the tank that is designed to trap the larger molecules and extract the larger molecules from the gas stream so that relatively pure methane reaches the bulk of the adsorbent in the tank. It is also possible to arrange the adsorbent to have various layers or strata, wherein each layer has a particular pore size. The inventors of the present disclosure have discovered that it is not necessary to separate the adsorbent into layers by pore size. The inventors of the present disclosure have recognized that each of the constituents of the natural gas have an affinity for pores of a particular size, and will tend to adsorb on the pores of that particular size before pores of other sizes.

As disclosed herein, natural gas adsorption/desorption is different from the adsorption/desorption of pure methane. In examples of the present disclosure, pore size distribution of the adsorbent is tuned to the different constituents of the natural gas not only for performance but kinetics and thermodynamics. Kinetics refers to the amount of gas molecules that are adsorbed and desorbed in a particular period of time.

An adsorbent with hierarchical and tailored pore sizes is disclosed herein. Also according to the present disclosure, a method for synthesizing the adsorbent with hierarchical and tailored pore sizes includes co-crystallization. As used herein, hierarchical porosity means pores of two or more different length scales (e.g., pore diameters) are found in the same structure. The structure may be a particle of co-crystallized adsorbent. Hierarchical porosity enables a porous structure to perform more than one function and hence broaden its capabilities. For example, a structure may have micropores that increase the specific surface area of the structure, leading to higher storage or purification capacities, while also having mesopores (pore diameters greater than about 20 Angstroms and less than about 500 Angstroms) that provide effective transport of the medium as well as structural integrity. In examples of the present disclosure, the hierarchical porosity of an adsorbent is matched to the mole percentage of constituents in natural gas.

While the shape of the container 12 shown in FIG. 1 is a cylindrical canister, it is to be understood that the shape and size of the container 12 may vary depending, at least in part, on an available packaging envelope for the pressurizable tank 20 in the natural gas fueled vehicle 10. For example, the size and shape may be changed in order to fit into a particular area of a vehicle trunk.

In the example shown in FIG. 1, the container 12 is a single unit having a single opening 18 or entrance. The opening 18 may be operatively fitted with a valve member 19, for charging the container 12 with the gas or for drawing-off the gas from the container 12. It is to be understood that manual and/or solenoid activated tank valves may be used in examples of the present disclosure. The valve member 19 is operatively connected to, and in fluid communication with the container 12 via the opening 18 defined in a wall of the container 12, the container wall having a thickness ranging, e.g., from about 3 mm to about 10 mm. It is to be understood that the opening 18 may be threaded for a typical tank valve (e.g., ¾×14 NGT (National Gas Taper Thread)). Further, it is to be understood that opening 18 may be located at any area of the container wall and is not necessarily located at the end as shown in FIG. 1.

While not shown, it is to be understood that the container 12 may be configured with other containers so that the multiple containers are in fluid (e.g., gas) communication through a manifold or other suitable mechanism.

As illustrated in FIG. 1, the natural gas adsorbent 24 is positioned within the container 12. The ability of the natural gas adsorbent 24 to repeatedly adsorb and desorb the natural gas depends on the suitability of the natural gas adsorbent 24 for adsorbing/desorbing the constituents of the natural gas. Existing adsorption storage tanks may perform for many adsorption/desorption cycles when tested with nearly pure methane. However when commercially available natural gas is introduced to the existing adsorption storage tanks, a mismatch in the pore size statistical distribution to the natural gas constituent statistical distribution of the natural gas causes pores in the adsorbent mixture to become blocked with larger molecule constituents. The larger molecules get stuck in the smaller pores. Ultimately, the existing adsorbent is unable to completely release the larger molecule constituents and the capacity for adsorbing and desorbing natural gas in the existing adsorbent drops after a number of adsorption/desorption cycles. Each cycle renders more of the adsorbent ineffective as an adsorbent as larger molecules engage more pores every time the existing adsorption storage tank is filled with natural gas.

In examples of the present disclosure, the pore size statistical distribution of the pores in the adsorbent is selected to match the mixture of constituents in the natural gas. FIG. 2 depicts a typical composition of pipeline natural gas in the United States of America. As shown in FIG. 2, the constituents 21 of pipeline natural gas may be found in a range of mole percentages 25. Mole percentages 25 are used since the statistical distribution of constituent 21 molecules is defined by the mole percentages 25 of the constituents 21. In an example of the present disclosure, the pores in the adsorbent have a pore size statistical distribution that matches the mole percentages 25 of the constituents 21 of the pipeline natural gas depicted in FIG. 2. In examples, the pore size statistical distribution of pores of the adsorbent may include: about 70 percent to about 90 percent of the total pores having a pore size from 10 to 12 Angstroms; about 0.1 percent to about 20 percent of the total pores having a pore size from 12 to 13 Angstroms; about 0.1 percent to about 1.5 percent of the total pores having a pore size from 13 to 14 Angstroms; about 0.1 percent to about 8 percent of the total pores having a pore size from 15 to 17 Angstroms; and a remaining percentage greater than about 17 Angstroms with an average pore size in the remaining percentage being about 20 Angstroms.

Figure 3:
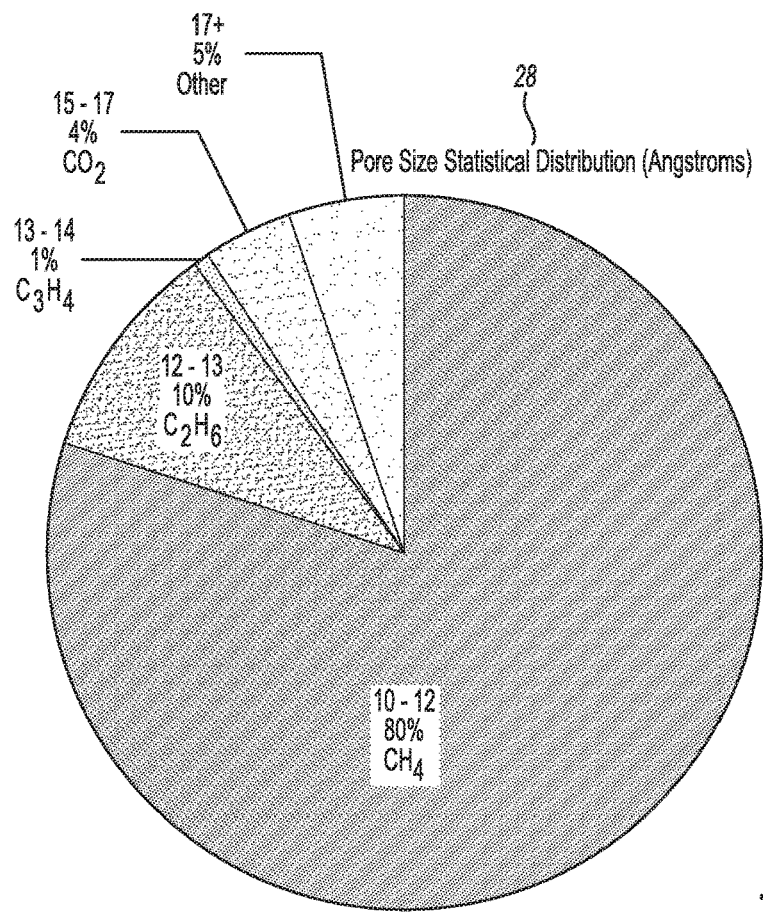
FIG. 3 is a pie chart that shows a particular statistical distribution of pore sizes that matches mole percentages of constituents in an average sample of pipeline natural gas.

FIG. 3 depicts a pore size statistical distribution based on the constituents of pipeline natural gas being at average mole percentages. In the example depicted in FIG. 3, 80 mole percent of the natural gas is methane; and 80 percent of the pores have a pore size of 10-12 Angstroms. Methane has an affinity for pores with a pore size of 10-12 Angstroms. 10 mole percent of the natural gas is ethane; and 10 percent of the pores have a pore size of 12-13 Angstroms. Ethane has an affinity for pores with a pore size of 12-13 Angstroms. 1 mole percent of the natural gas is propane; and 1 percent of the pores have a pore size of 13-14 Angstroms. Propane has an affinity for pores with a pore size of 13-14 Angstroms. 4 mole percent of the natural gas is carbon dioxide; and 4 percent of the pores have a pore size of 15-17 Angstroms. Carbon dioxide has an affinity for pores with a pore size of 15-17 Angstroms. 5 mole percent of the natural gas is other constituent gases; and 5 percent of the pores have a pore size greater than 17 Angstroms. The other gases have an affinity for pores with a pore size greater than 17 Angstroms.

In general, the adsorbent 24 has a high surface area and is porous. The pore size statistical distribution of the pores is generally aligned with the effective molecular diameter of each of the constituents of the natural gas. "Generally aligned" means that the mole percentage of larger effective molecular diameters is about the same as the percentage of pores with larger pore size. However, there is not a particular ratio of effective molecular diameter to pore size. In an example, the pore size distribution is such that there are pores having an effective molecular diameter of the smallest constituents to be adsorbed and pores having an effective molecular diameter of the largest constituents to be adsorbed. In an example, the adsorbent 24 has a Brunauer-Emmett-Teller (BET) surface area greater than about 50 square meters per gram ($m^2/g$) and up to about 3,000 $m^2/g$, and includes a plurality of pores having a pore size from about 10 Angstroms to about 25 Angstroms.

Examples of suitable adsorbents 24 include carbon (e.g., activated carbons, super-activated carbon, carbon nanotubes, carbon nanofibers, carbon molecular sieves, etc.), metal-organic framework (MOF) materials, porous polymer networks (e.g., PAF-1 or PPN-4), and combinations thereof. Examples of suitable metal-organic frameworks include HKUST-1, MOF-74, ZIF-8, and/or the like, which are constructed by linking tetrahedral clusters with organic linkers (e.g., carboxylate linkers).

The volume that the adsorbent 24 occupies in the container 12 will depend upon the density of the adsorbent 24. In an example, the density of the adsorbent 24 may range from about 0.1 g/cc to about 0.9 g/cc. A well-packed adsorbent 24 may have a bulk or bed density of about 0.5 g/cc. In an example, a 100 L container may include an amount of adsorbent that occupies about 50 L. For example, an amount of adsorbent that occupies about 50 L means that the adsorbent would fill a 50 L container. It is to be understood, however, that there is space available in the pores of the adsorbent and between the particles of adsorbent, and having an adsorbent that occupies 50 L in a 100 L container does not reduce the capacity of the container for natural gas by 50 L.

The present disclosure includes a method of making an adsorbent for releasably storing a natural gas comprising co-crystallizing a first adsorbent in the presence of a second adsorbent in a predetermined mass ratio to produce a co-crystallized adsorbent with hierarchical diffusion paths. In examples of the present disclosure, the first adsorbent may be a Metal Organic Framework (MOF) and the second adsorbent may be a carbon filler. In an example, the MOF may be Cu-BTC (Copper benzene-1,3,5-tricarboxylic acid) and the filler may be carbon aerogel and carbon nanotubes. BTC is also known as trimesic acid.

MOFs are in a class of porous, crystalline materials with a broad range of applications. MOFs are composed of metal ions or clusters, which act as the joints, bound by multidirectional organic ligands, which act as linkers in the network structure. These networks can be 1-D, 2-D, or 3-D extended, periodic structures. The joints and linkers assemble in such a way that regular arrays are formed resulting in robust (often porous) materials analogous to zeolites. Some existing MOFs are microporous (pore diameters of less than 2 nm (20 Angstroms)) as defined by IUPAC based on the type of gas sorption isotherm the material displays. Via alteration of organic units, MOFs may provide tailored materials for given applications. For example, the length of the organic linker may define the size of resulting pores of a given material. Furthermore, functionalization of the organic unit can provide functionalized pores. MOFs provide a selection of different pore shapes and sizes by combining different metals (e.g. Al, Cu, Fe, and Zn) and different organic linkers (e.g. BDC (bis-(9-octylamino(2-dimethylaminoethyl)acridine-4-carboxamide), and BTC).

Cu-BTC is a copper-based MOF, also known as HKUST-1 and MOF-199. Blue cubic crystals are formed under solvothermal conditions. Under these conditions, CuII paddlewheel dimers form readily to act as square-planar building blocks and are linked by the trimesate trianions that act as trigonal-planar building blocks. These crystals are then exchanged into a low boiling solvent and evacuated under vacuum at elevated temperature to generate a porous material. Prior to evacuation, solvent molecules, generally water, fill the axial coordination positions of the CuII-paddlewheels. The Langmuir surface area of Cu-BTC may be about 2200 $m^2/g$.

In an example of the present disclosure, the process for making Cu-BTC described above is altered by adding carbon filler particles, e.g. powdered carbon aerogel and carbon nanotubes, to the solvothermal crystallization process. The Cu-BTC crystallization described above is modified to a co-crystallization process in which the Cu-BTC structure grows around the carbon aerogel and carbon nanotubes. The carbon filler particles are thereby inserted into the Cu-BTC crystals. The co-crystallization with the carbon filler particles alters the pore sizes of the Cu-BTC crystals as shown schematically in FIG. 4.

In examples of the present disclosure, the co-crystallization may include a solvothermal reaction of a linker acid with a structural building unit source. The structural building unit source may be, for example, a metal nitrate or a metal sulfate. The linker acid is a source of organic ligands for the co-crystallized adsorbent. As such, the co-crystallized adsorbent may include a MOF as disclosed herein. In examples, the solvothermal reaction may be at about 85 degrees C. to about 105 degrees C. in N,N'-diethylformamide or water for about 24 hours in a Parr acid digestion bomb.

Figure 4:
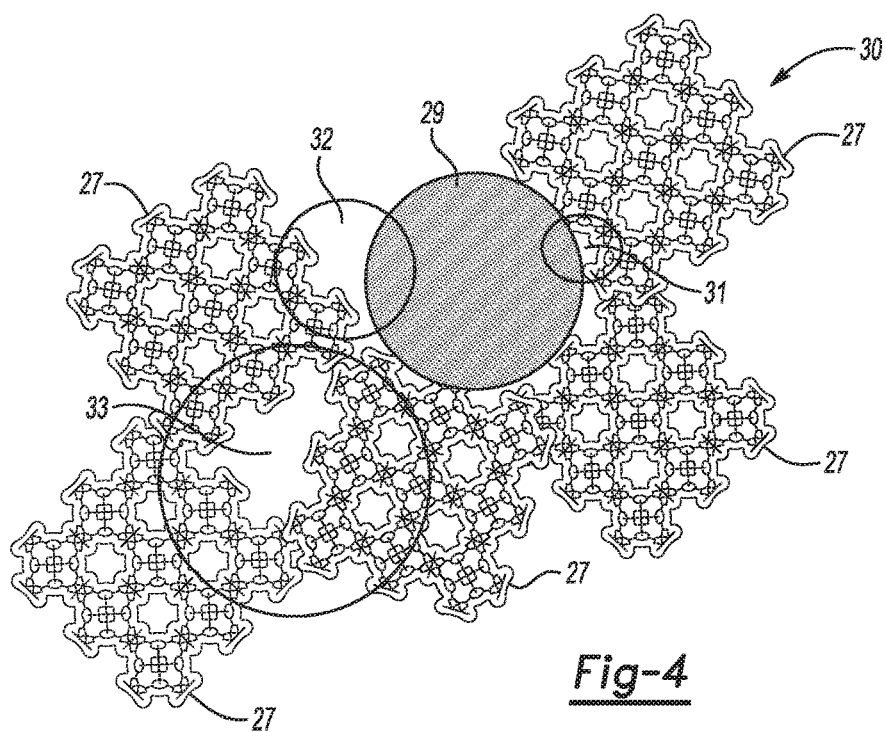
FIG. 4 is a schematic diagram depicting Cu-BTC (Copper benzene-1,3,5-tricarboxylic acid) co-crystallized with a carbon particle according to the present disclosure.

FIG. 4 is a schematic diagram depicting Cu-BTC 27 co-crystallized with a carbon particle 29 according to the present disclosure. The co-crystallized Cu-BTC carbon 30 defines hierarchical pores. In addition to the pores defined by a typical Cu-BTC crystal, the co-crystallized Cu-BTC carbon 30 defines small micropores 31, larger micropores 32 and mesopores 33.

According to the present disclosure, the adsorbents synthesized by co-crystallization may be mixed together to form a homogeneous mixture of adsorbents with a pore-size statistical distribution. In another example of the present disclosure, the co-crystallization may be done with more than one filler material at the same time. In this way, the hierarchical pores in the adsorbent will have a statistical distribution that is tailored by varying the amount and variety of filler materials.

To further illustrate the present disclosure, examples are given herein. It is to be understood that these examples are provided for illustrative purposes and are not to be construed as limiting the scope of the present disclosure.

Example 1

Figure 6:
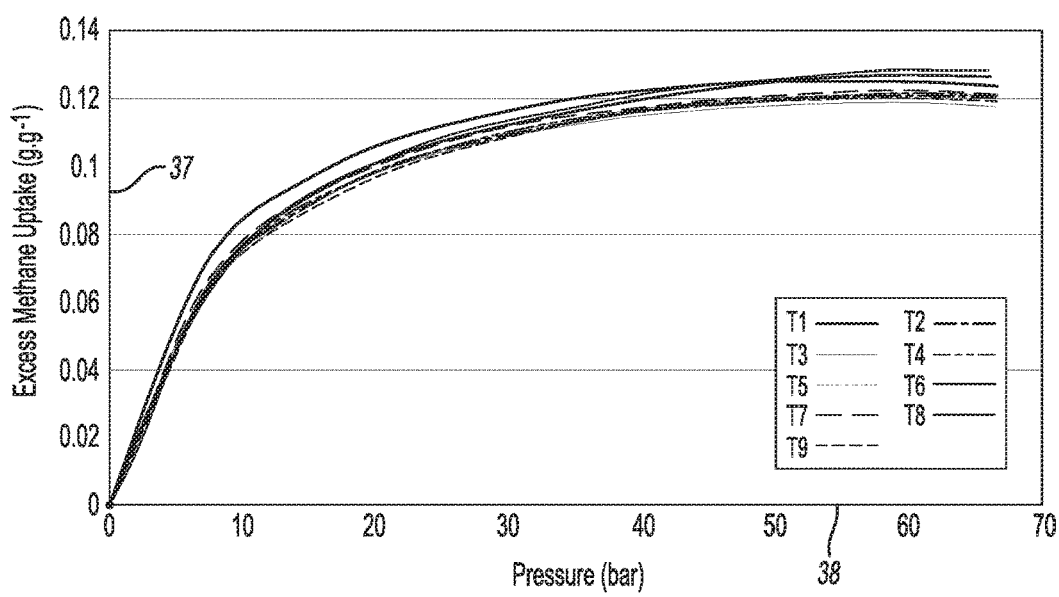
FIG. 6 is a graph depicting excess methane uptake in grams per gram vs. pressure in Bars for repeated fills of UHP (Ultra High Purity) methane into a tank with existing HKUST-1 adsorbent.
Figure 7:
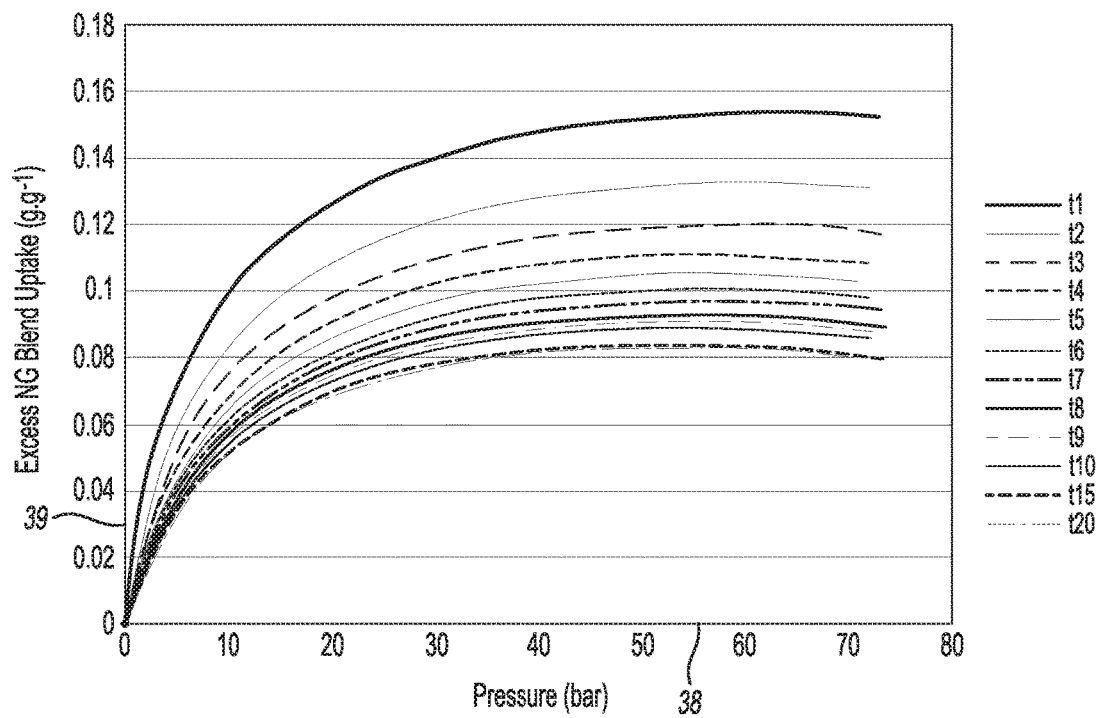
FIG. 7 is a graph depicting excess natural gas blend uptake in grams per gram vs. pressure in Bars for repeated fills of the natural gas blend into a tank with existing HKUST-1 adsorbent.

A test was run to verify the adsorption/desorption performance of a HKUST-1. FIG. 6 depicts excess methane uptake 37 in grams per gram vs. pressure 38 in Bars as the pressurizable tank is pressurized with Ultra-High Purity (UHP) methane. UHP methane has a minimum purity of 99.99%. FIG. 6 shows that over the course of 9 trials (T1-T9), the excess methane uptake was repeatable within about 5 percent. FIG. 7 depicts excess natural gas blend uptake 39 in grams per gram vs. pressure 38 in Bars as the pressurizable tank is pressurized with a typical Natural Gas blend of constituents. The particular blend of natural gas used in the example depicted in FIG. 7 was hexane 0.1032 mole %, propane 2.4 mole %, $CO_2$ 3.06 mole %, ethane 4.16 mole % and methane balance. FIG. 7 shows that excess Natural Gas uptake reduced by about 50 percent over 20 trials (t1-t20). Thus, testing an adsorbent using pure methane rather than natural gas that has constituents other than methane, can fail to detect that the adsorption/desorption performance of the adsorbent may decay after repeated refilling.

Example 2

Figure 5:
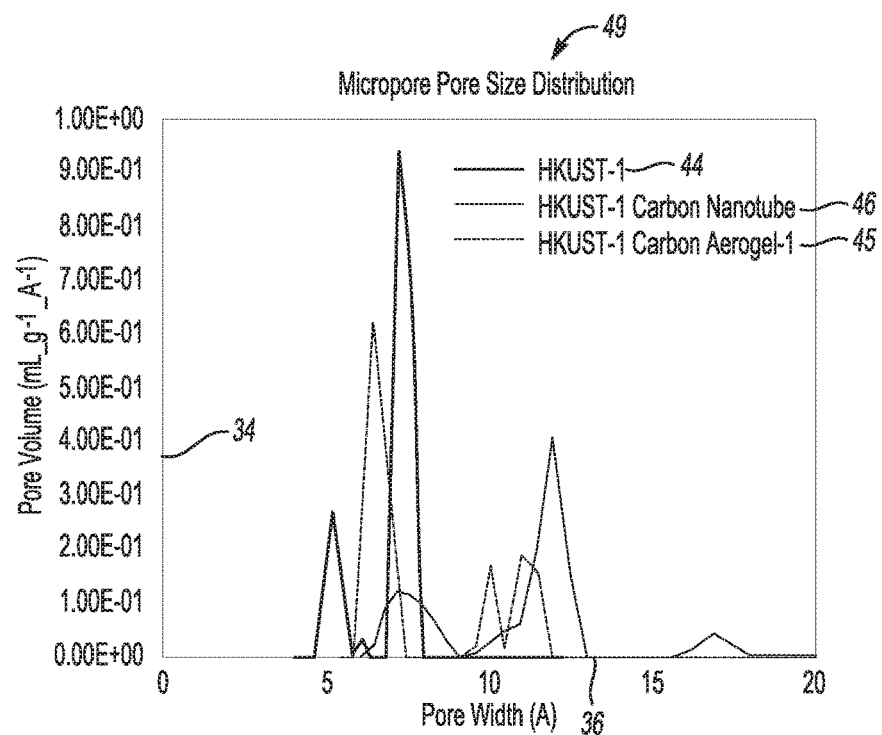
FIG. 5 is a graph depicting pore volume vs. pore width for existing HKUST-1 and HKUST-1 co-crystallized with carbon nanotubes and carbon aerogel according to the present disclosure.

HKUST-1 was co-crystallized with carbon fillers. The control specimen 44 was a tank with HKUST-1 adsorbent synthesized without co-crystallized filler. Specimen A 45 was a similar tank to the control tank with HKUST-1 adsorbent that was co-crystallized with 10 weight percent Carbon Aerogel with an average pore size of 10 nm. Specimen B 46 was a similar tank to the control tank with HKUST-1 adsorbent that was co-crystallized with 10 weight percent 10 nm diameter Multi-Wall Carbon Nanotubes (MWCNT). FIG. 5 is a graph of micropore pore size distribution 49 depicting pore volume 34 (in units of mL (milliliter) per gram per Angstrom) vs. pore width 36 (in units of Angstroms) for the Control specimen 44, Specimen A 45 (HKUST-1+Carbon Aerogel) and Specimen B 46 (HKUST-1+MWCNT). The Control specimen 44 has a significant number of pores with about 5 Angstrom pore width, and a larger number of pores with about 7 Angstrom pore width. Specimen A 45 (HKUST-1+Carbon Aerogel) has a peak at about 6.5 Angstroms, and smaller peaks at about 10 Angstroms and about 11.5 Angstroms. Specimen B 46 (HKUST-1+MWCNT) has a peak centered at about 7 Angstroms, a larger peak at about 12 Angstroms and a small peak at about 17 Angstroms.

Figure 8:
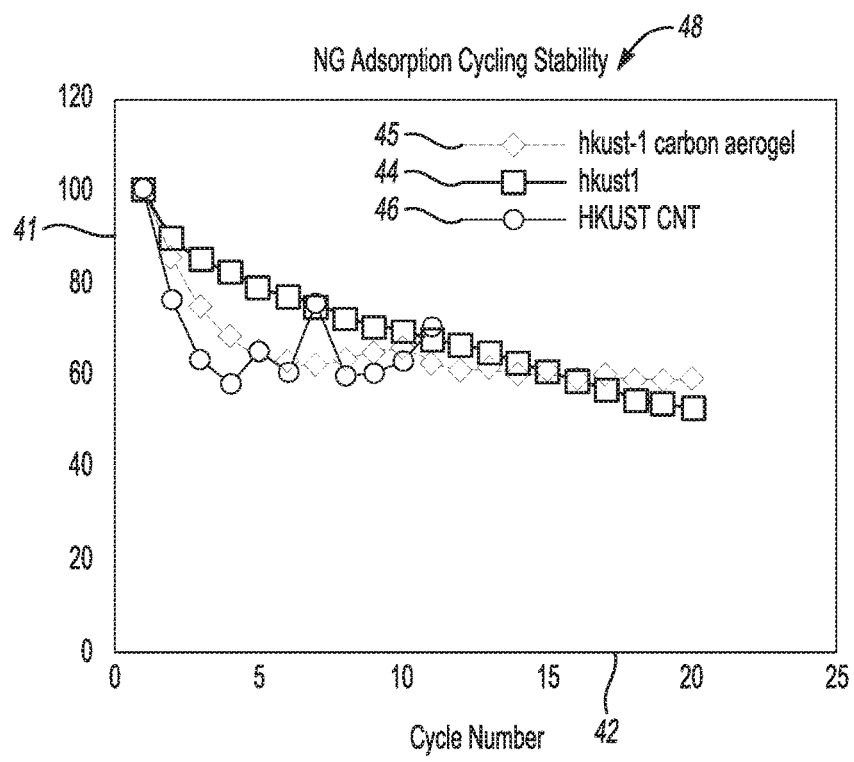
FIG. 8 is a graph depicting maximum excess natural gas adsorption vs. fill cycle number for HKUST-1 and for co-crystallized adsorbents according to the present disclosure.

FIG. 8 is a graph depicting maximum excess natural gas adsorption 41 vs. fill cycle number 42 for the Control specimen 44 HKUST-1 and for co-crystallized adsorbents 45 (HKUST-1+Carbon Aerogel) and 46 (HKUST-1+MWCNT) according to the present disclosure. FIG. 8 depicts natural gas adsorption cycling stability 48. FIG. 8 shows that the excess natural gas adsorption continued to fall through 20 trials for the control specimen 44. Specimen A 45 (HKUST-1+Carbon Aerogel) stabilized after about 6 trials. Specimen B 46 (HKUST-1+MWCNT) seemed to be stabilized or even increasing at 11 trials, however no more trials were run after the 11th trial for Specimen B 46 (HKUST-1+MWCNT).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range at about 85 degrees C. to about 105 degrees C. should be interpreted to include not only the explicitly recited limits of from about 85 degrees C. to about 105 degrees C., but also to include individual values, such as 85 degrees C., 98 degrees C., 102.5 degrees C., etc., and sub-ranges, such as from about 88 degrees C. to about 100 degrees C.; from about 90 degrees C. to about 101 degrees C., etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An adsorbent for releasably storing a natural gas, the adsorbent comprising:
    a body defining a plurality of pores, wherein:
    a first portion of the plurality of pores defines a pore size ranging from 10 to 12 Angstroms, the first portion comprising about 70 percent to about 90 percent of a total quantity of pores of the plurality of pores;
    a second portion of the plurality of pores defines a pore size ranging from 12 to 13 Angstroms, the second portion comprising about 0.1 percent to about 20 percent of the total quantity of pores of the plurality of pores;
    a third portion of the plurality of pores defines a pore size ranging from 13 to 14 Angstroms, the third portion of the plurality of pores comprising about 0.1 percent to about 1.5 percent of the total quantity of pores of the plurality of pores;
    a fourth portion of the plurality of pores defines a pore size ranging from 15 to 17 Angstroms, the fourth portion comprising about 0.1 percent to about 8 percent of the total quantity of pores of the plurality of pores; and
    a fifth portion of the plurality of pores having a pore size of greater than about 17 Angstroms, the fifth portion comprising a remaining percentage of the total quantity of pores of the plurality of pores, an average pore size in the fifth portion being about 20 Angstroms.

2. The adsorbent as defined in claim 1, wherein a physical distribution of pore sizes of the adsorbent is homogenous.

3. The adsorbent as defined in claim 1, wherein the adsorbent is selected from the group consisting of carbon, metal-organic framework (MOF) materials, porous polymer networks, and combinations thereof.

4. The adsorbent as defined in claim 3, wherein the adsorbent comprises a MOF defining hierarchical diffusion paths.

5. The adsorbent as defined in claim 1, wherein the adsorbent comprises Cu-BTC co-crystallized with carbon aerogel and carbon nanotubes.

6. The adsorbent as defined in claim 1, wherein:
the adsorbent defines a Brunauer-Emmett-Teller (BET) surface area ranging from about 50 square meters per gram ($m^2/g$) to about 3,000 $m^2/g$; and
the adsorbent defines a density ranging from about 0.1 g/cc to about 0.9 g/cc.

7. An adsorption storage tank for a natural gas, comprising:
a pressurizable tank disposed on a vehicle and configured to contain the natural gas; and
a natural gas adsorbent disposed in the pressurizable tank, the natural gas adsorbent defining a plurality of pores, wherein:
a first portion of the plurality of pores defines a pore size from 10 to 12 Angstroms, the first portion comprising about 70 percent to about 90 percent of a total quantity of pores of the plurality of pores;
a second portion of the plurality of pores defines a pore size from 12 to 13 Angstroms, the second portion comprising about 0.1 percent to about 20 percent of the total quantity of pores of the plurality of pores;
a third portion of the plurality of pores defines a pore size from 13 to 14 Angstroms, the third portion comprising about 0.1 percent to about 1.5 percent of the total quantity of pores of the plurality of pores;
a fourth portion of the plurality of pores defines a pore size from 15 to 17 Angstroms, the fourth portion comprising about 0.1 percent to about 8 percent of the total quantity of pores of the plurality of pores; and
a fifth portion of the plurality of pores defines a pore size greater than about 17 Angstroms, the fifth portion comprising a remaining percentage of the total quantity of pores of the plurality of pores.

8. The adsorption storage tank as defined in claim 7, wherein a physical distribution of pore sizes of the natural gas adsorbent is homogenous.

9. The adsorption storage tank as defined in claim 7, wherein the natural gas adsorbent is selected from the group consisting of carbon, metal-organic framework (MOF) materials, porous polymer networks, and combinations thereof.

10. The adsorption storage tank as defined in claim 9, wherein the natural gas adsorbent comprises a MOF defining hierarchical diffusion paths.

11. The adsorption storage tank as defined in claim 7, wherein the natural gas adsorbent comprises copper benzene-1,3,5-tricarboxylic acid co-crystallized with carbon aerogel and carbon nanotubes.

12. The adsorption storage tank as defined in claim 7, wherein an average pore size of the fifth portion is about 20 Angstroms.

13. The adsorption storage tank as defined in claim 7, wherein the natural gas adsorbent defines a Brunauer-Emmett-Teller (BET) surface area ranging from about 50 square meters per gram ($m^2/g$) to about 3,000 $m^2/g$.

14. The adsorption storage tank as defined in claim 7, wherein the natural gas adsorbent defines a density ranging from about 0.1 g/cc to about 0.9 g/cc.

15. A method of making an adsorbent for releasably storing a natural gas, comprising:
co-crystallizing a first adsorbent and a second adsorbent in a predetermined mass ratio to produce a co-crystallized adsorbent with hierarchical diffusion paths, the co-crystallized adsorbent having a body defining a plurality of pores, wherein:
a first portion of the plurality of pores defines a pore size from 10 to 12 Angstroms, the first portion comprising about 70 percent to about 90 percent of a total quantity of pores of the plurality of pores;
a second portion of the plurality of pores defines a pore size from 12 to 13 Angstroms, the second portion comprising about 0.1 percent to about 20 percent of the total quantity of pores of the plurality of pores;
a third portion of the plurality of pores defines a pore size from 13 to 14 Angstroms, the third portion of the plurality of pores comprising about 0.1 percent to about 1.5 percent of the total quantity of pores of the plurality of pores;
a fourth portion of the plurality of pores defines a pore size from 15 to 17 Angstroms, the fourth portion comprising about 0.1 percent to about 8 percent of the total quantity of pores of the plurality of pores; and
a fifth portion of the plurality of pores defines a pore size greater than about 17 Angstroms, the fifth portion comprising a remaining percentage of the total quantity of pores of the plurality of pores, an average pore size in the fifth portion being about 20 Angstroms.

16. The method as defined in claim 15, wherein:
the co-crystallizing includes a solvothermal reaction of a linker acid with a structural building unit source; and
the structural building unit source is a metal nitrate or a metal sulfate.

17. The method as defined in claim 16, wherein the solvothermal reaction is at 85 degrees C. to 105 degrees C. in N,N'-diethylformamide or water for about 24 hours in a Parr acid digestion bomb.

18. The method as defined in claim 16, wherein the first adsorbent is a Metal Organic Framework (MOF), and the second adsorbent is a carbon filler.

19. The method as defined in claim 18, wherein the MOF is copper benzene-1,3,5-tricarboxylic acid, and the carbon filler is carbon aerogel and carbon nanotubes.

* * * * *